(12) United States Patent
Acda et al.

(10) Patent No.: US 10,926,496 B2
(45) Date of Patent: Feb. 23, 2021

(54) MACHINE AND METHOD FOR AN AUTOMATED FILLING OF A MOLD ASSEMBLY FOR MOLDING AN OPHTHALMIC LENS

(71) Applicant: ESSILOR INTERNATIONAL (COMPAGNIE GENERALE D'OPTIQUE), Charenton-le-Pont (FR)

(72) Inventors: Amparo Acda, Charenton-le-Pont (FR); Ratchapoom Maruthanont, Charenton-le-Pont (FR); Chatree Homwongs, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 370 days.

(21) Appl. No.: 15/108,533

(22) PCT Filed: Dec. 23, 2014

(86) PCT No.: PCT/EP2014/079240
§ 371 (c)(1),
(2) Date: Jun. 27, 2016

(87) PCT Pub. No.: WO2015/097245
PCT Pub. Date: Jul. 2, 2015

(65) Prior Publication Data
US 2016/0325512 A1 Nov. 10, 2016

(30) Foreign Application Priority Data
Dec. 27, 2013 (EP) .................................... 13306887

(51) Int. Cl.
*B29D 11/00* (2006.01)
*B29C 31/04* (2006.01)
(Continued)

(52) U.S. Cl.
CPC ...... *B29D 11/00538* (2013.01); *B29C 31/042* (2013.01); *B29C 31/06* (2013.01);
(Continued)

(58) Field of Classification Search
CPC ............. G01F 23/2928; G01F 23/2922; G01F 23/2921; G01F 23/2924; G01F 23/2925;
(Continued)

(56) References Cited

U.S. PATENT DOCUMENTS 5,605,656 A * 2/1997 Sasano .................... B29C 39/44
264/1.1
6,103,148 A * 8/2000 Su ..................... B29D 11/00413
264/1.38
(Continued)

FOREIGN PATENT DOCUMENTS

EP  1541314    6/2005
JP  02169208 A * 6/1990  ......... B29C 45/7613
(Continued)

OTHER PUBLICATIONS

Machine Translation of JP 2002-018866 (Year: 2002).*
(Continued)

*Primary Examiner* — Leith S Shafi
(74) *Attorney, Agent, or Firm* — Norton Rose Fulbright US LLP (57) ABSTRACT

The present disclosure relates to a machine for an automated filling of a mold assembly for molding an ophthalmic lens, comprising: filling means to fill the mold assembly with a molding material through a filling aperture provided in the mold assembly, acquiring means to acquire an input value linked to the internal volume of the mold assembly, and control means for controlling the flow rate of molding (Continued)

material injected by the filling means in the mold assembly according to a flow rate profile deduced as a function of said input value.

24 Claims, 4 Drawing Sheets

(51) Int. Cl.
    *B29C 31/06*     (2006.01)
    *B29C 39/02*     (2006.01)
    *B29C 39/24*     (2006.01)
    *B29C 39/44*     (2006.01)
    *G02C 7/02*     (2006.01)
    *G05B 15/02*     (2006.01)
    *B29L 11/00*     (2006.01)

(52) U.S. Cl.
    CPC .............. *B29C 39/02* (2013.01); *B29C 39/24* (2013.01); *B29C 39/44* (2013.01); *B29D 11/00413* (2013.01); *B29D 11/00432* (2013.01); *B29D 11/00528* (2013.01); *B29D 11/00951* (2013.01); *G02C 7/022* (2013.01); *G05B 15/02* (2013.01); *B29K 2995/0026* (2013.01); *B29L 2011/0016* (2013.01)

(58) Field of Classification Search
    CPC ............... G01F 23/2927; G01F 23/282; B29D 11/00538; B29D 11/00528; B29D 11/00432; B29D 11/00951; B29D 11/00413; B29D 11/00; B29D 11/00961; B29D 11/0099; G02C 7/022; B29C 39/02; B29C 39/44; B29C 39/24; B29C 31/06; B29C 31/042; B29C 45/76; B29C 2945/76; B29C 45/7613; G05B 15/02; B29L 2011/0016; B29K 2995/0026; G01N 11/02; G01N 1/04; G01N 1/06; G01N 21/01; G01N 2021/0187; G01N 21/85; G01N 2021/8557
    USPC ........ 700/197, 204, 195, 281, 240; 425/808; 264/1.32, 299–307
See application file for complete search history.

(56) References Cited

U.S. PATENT DOCUMENTS

| | | | | |
|---|---|---|---|---|
| 6,623,669 | B1* | 9/2003 | Slack | .................... B29C 31/006 118/695 |
| 2002/0195732 | A1* | 12/2002 | Clark | ................ B29D 11/0048 264/2.5 |
| 2004/0150125 | A1* | 8/2004 | Huard | ................ B29C 33/0061 264/1.1 |

FOREIGN PATENT DOCUMENTS

| | | | | |
|---|---|---|---|---|
| JP | 08244048 | A | * | 9/1996 |
| JP | 10264179 | A | * | 10/1998 |
| JP | 2002 018866 | | | 1/2002 |
| JP | 2004050489 | A | * | 2/2004 |
| JP | 2006272576 | A | * | 10/2006 |
| JP | 2008137336 | A | * | 6/2008 |
| WO | WO 98/36868 | | | 8/1998 |

OTHER PUBLICATIONS

Machine translation of JP-10264179-A (Year: 1998).*
Machine translation of JP-2004050489-A (Year: 2004).*
Machine Translation of JP-2008137336-A (Year: 2008).*
Machine Translation of JP-H02169208-A (Year: 1990).*
Machine Translation of JP-2006272576-A (Year: 2006).*
Machine translation of JP-08244048-A (Year: 1996).*
International Search Report and Written Opinion issued in PCT/EP2014/079240, dated Mar. 18, 2015.

* cited by examiner

MACHINE AND METHOD FOR AN AUTOMATED FILLING OF A MOLD ASSEMBLY FOR MOLDING AN OPHTHALMIC LENS

CROSS-REFERENCE TO RELATED APPLICATIONS

This application is a national phase application under 35 U.S.C. § 371 of International Application No. PCT/EP2014/079240 filed 23 Dec. 2014, which claims priority to European Patent Application No. 13306887.4 filed 27 Dec. 2013. The entire contents of each of the above-referenced disclosures is specifically incorporated by reference herein without disclaimer.

TECHNICAL FIELD TO WHICH THE INVENTION RELATES

The present invention relates in general to molding ophthalmic lenses.

The invention applies more particularly to high-refraction lenses, made from polymerizable synthetic material.

TECHNOLOGICAL BACKGROUND

A traditional mold assembly comprises two molding shells at the periphery of which is disposed an annular closure member that defines with these shells a molding cavity.

The two molding shells are generally made of a transparent material when the closure member may be a scotch tape.

The conventional way to fill a mold made up in this way is by causing a molding material to flow into the molding cavity through a filling aperture provided for this purpose in the closure member. This filling aperture is at the periphery of the molding shells so as not to interfere with the optically active area of the ophthalmic lens formed.

High-refractive index lenses are made from a molding material that is difficult to process. Indeed all transparent molding materials are difficult to process by casting. With such a material, it is important to minimize perturbations in the flow of molding material during filling of the mold. Such perturbations may indeed generate haze or leave traces that persist during polymerization and modify local transparency.

At present, this kind of ophthalmic lenses is manually molded. During the operation of filling, the mold assembly is initially maintained in a horizontal position, and is progressively inclined in a vertical position until the end of the filling.

The main problem in manually molding lenses is a problem of efficiency. We understand that such a method does not allow to use a high flow rate in order to fill the molding cavity, so as to limit the production yield. Moreover, operators are not infallible, creating waste.

Another problem consists in reducing the risk for the operators of manipulating such a molding material. This kind of polymerizable synthetic material comprises indeed hazardous chemicals (UHI monomer, MR7, MR8) and requires the use of protective clothing, which reduces the efficiency of operators and increases the production cost of the lenses.

OBJECT OF THE INVENTION

The object of the present invention consists in automatizing the filling of the mold assemblies.

To this end, the invention provides a machine for an automated filling of a mold assembly for molding an ophthalmic lens, comprising:
filling means to fill the mold assembly with a molding material through a filling aperture provided in the mold assembly,
acquiring means to acquire an input value linked to the internal volume of the mold assembly, and
control means for controlling the flow rate of molding material injected by the filling means in the mold assembly according to a flow rate profile determined as a function of said input value.

The invention also provides a process of automated filling of a mold assembly for molding an ophthalmic lens, with a machine comprising filling means to fill the mold assembly and control means for controlling the flow rate of molding material injected by the filling means in the mold assembly, said process comprising steps of:
acquiring an input value linked to the internal volume of the mold assembly,
deducing from said input value a flow rate profile, and
controlling the flow rate of molding material injected by the filling means in the mold assembly according to said flow rate profile.

Two main problems encountered when trying to mechanize the filling operations are to minimize the perturbations in the flow of molding material and to prevent overflow at the end of the filling.

Another problem is to handle a very wide variety of volumes, dimensions and shapes of mold assemblies to fill, that arrive with no predictable order.

According to the invention, a parameter relative to the internal volume of the molding assembly is acquired (the input value). Then by using a predetermined flow rate profile that is deduced from this parameter and that is appropriate to the molding assembly, the molding assembly is filled. Consequently, the machine and process are able to fill a wide variety of molding assemblies at high speed, and without risk of overflow.

Finally, the use of automatic means reduces significantly the operator exposure to molding material.

In an embodiment, the input value is the width of the aperture provided in the molding assembly for filling it. Indeed, the applicant has noticed that this width is linked to the internal volume of the mold assembly.

In other variants, this input value could include at least one these parameters:
the sphere power of the lens to mold,
the cylinder power of the lens to mold,
the diameter of the lens to mold or the diameter of mold assembly,
a value that is read on a barcode written on the mold assembly and that is directly linked to the internal volume of the mold assembly.

In another variant, the input value could include the width of the aperture and the cylinder power of the lens to mold. Indeed, the internal volume of the mold assembly is affected by the cylinder power of the lens to mold, so that the width of the aperture can be considered as not precise enough to approximate the inner volume of the mold assembly.

In an embodiment, the filling is automatically interrupted, not when a predetermined volume of molding material has been injected in the mold assembly, but at the exact moment when the mold assembly is full of molding material.

That is a further reason why the invention applies to all volumes of molding cavities and prevents overflow at the end of the filling.

Thanks to this embodiment, the introduction of molding material into the mold assembly, called casting step, can be operated by using a high flow rate of molding material, without moving the mold assembly relative to the filling means during the casting step.

Other characteristics of the machine of the invention that are advantageous and non-limiting are:

said input value is the width of the filling aperture, measured between two molding shells of the mold assembly;

the acquiring means comprises scanning means that are able to determine the width of said filling aperture, said scanning means being optionally able to determine a position of an internal face of the mold assembly which is convex and said control means being optionally suitable for positioning a nozzle of the filling means near said convex internal face;

the machine being suitable for filling a batch of several mold assemblies having essentially a same internal volume, the control means are suitable for:

controlling the flow rate of molding material injected in a first mold assembly according to a learning flow rate profile that is determined as a function of the measured input value and which preferably exhibits mainly a single constant value, when the first mold assembly is completely filled, acquiring a measured value that is relative to the internal volume of the first mold assembly, and filling the other mold assemblies of the batch according to a flow rate profile determined as a function of said measured value;

said measured value is the duration of the filling of the first mold assembly;

the flow rate profile comprising at least a high flow rate level and a low flow rate level determined as a function of said input value, and preferably the flow rate profile includes in the following order a ramp-up to initiate the filling of the mold assembly, the high-flow rate level, an intermediate ramp-down, the low-flow rate level, and a final ramp-down to end the flow and thus end the filling of the mold assembly;

a duration of the high-flow rate level is determined by the control means as a function of said measured value and said input value, the durations of any ramp-up and of any ramp-down are determined by the control means as a function of said input value;

the machine comprises detecting means for detecting a complete filling of the mold assembly and for sending a signal to the control means when the mold assembly is completely filled, the control means being suitable for immediately stopping the injection of molding material when they receive said signal from the detecting means;

the control means are suitable for positioning the detecting means and the filling means relative to each other as a function of said input value;

the control means are suitable for positioning the detecting means and the filling means relative to each other, and preferably relative to the filling aperture, as a function of said input value, along an axis present in a plan representative of the filling aperture and along an axis perpendicular to said plan;

the control means are suitable for positioning the detecting means and the filling means relative to the filling aperture as a function of said input value, along an axis present in a plan representative of the filling aperture and along an axis perpendicular to said plan;

the detecting means comprise a vacuum pump with a vacuum nozzle positioned near the filling aperture of the mold assembly, and a sensor suitable for measuring a pressure in said vacuum nozzle, the vacuum nozzle being positioned and designed so that it is able to suck any excess of molding material out of the mold assembly;

the filling means comprise a pump suitable for displacing the molding material from a storage tank to an output nozzle, the control means are suitable for controlling the pump, a pinch valve is provided to apply pressure on a pipe connecting the pump and the output nozzle, and the control means are suitable for controlling the pinch valve so that it applies pressure against the pipe during the filling of the mold assembly and it releases the pressure on the pipe immediately when the mold assembly is completely filled;

the mold assembly comprising two molding shells and an annular closure scotch tape disposed at the periphery of the molding shells, closing means are provided with a pusher suitable for pushing an end of the scotch tape in order to close the filling aperture, the control means are suitable for controlling the position of the pusher, and the closing means comprise a vacuum suction device to suck the excess of molding material pushed out by the scotch tape while closing the filling aperture;

after having acquired said input value, the control means are suitable for searching in a database registry for a record associated to said input value, and if no corresponding record is found, creating a new record associated with said input value and containing a flow rate profile.

Other characteristics of the process of the invention that are advantageous and non-limiting are:

the process comprises the further steps of detecting a complete filling of the mold assembly and, when a complete filling of the mold assembly is detected, immediately stopping the injection of molding material;

for filling a batch of several mold assemblies having essentially a same volume, the first mold assembly is filled according to a learning flow rate profile determined as a function of the measured input value and preferably exhibiting mainly a single constant value, and the other mold assemblies of the batch are filled according to a flow rate profile that has a non-constant value and that is determined as a function of said input value and as a function of a duration of the filling of the first mold assembly;

if the input value of the mold assemblies of the considered batch is known to be roughly equal to the input value of the mold assemblies of the previous batch filled by said machine, and if the diameter of the molds are essentially equal, all the mold assemblies of the considered batch are filled according to a flow rate profile identical to the flow rate profile used for filling the mold assemblies of the previous batch;

if the input value is stored in a database registry comprising at least two records that associate flow rate profiles to input values, all the mold assemblies of the considered batch are filled according to the flow rate profile that is stored in the database registry and that corresponds to the input value.

DETAILED DESCRIPTION OF AN EMBODIMENT

The following description with reference to the accompanying drawings, given by way of non-limiting example makes it clear what the invention consists in and how it can be reduced to practice.

Figure 1:
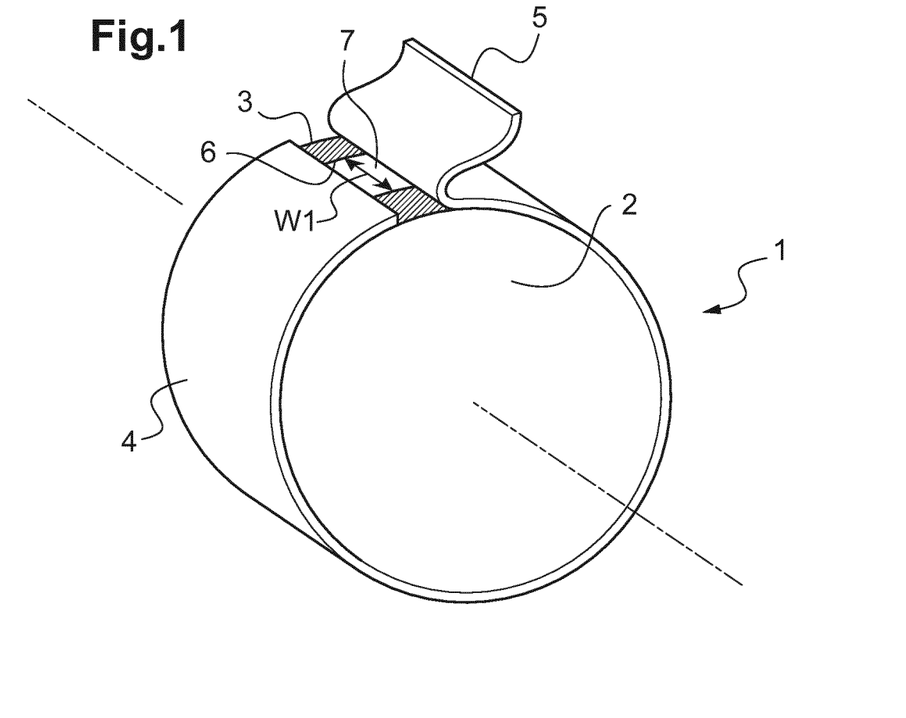
FIG. 1 is a schematic view in perspective of a mold assembly.

In the accompanying drawings:

FIG. 1 shows a mold assembly 1.

This mold assembly 1 comprises two molding shells 2, 3 at the periphery of which is disposed an annular closure member 4. In the shown example, the annular closure member is a scotch tape 4 that recovers the edges of the molding shells and maintains one molding shell at a distance from the other molding shell.

Thus, the two molding shells 2, 3 and the scotch tape 4 define together a molding cavity 7 to be filled with a molding material (called hereafter "monomer").

This molding cavity 7 is lens-shaped, with two principal internal faces 2A, 3A and a circular edge. One of its internal faces 2A is convex when its other internal face 3A is concave (see FIGS. 6 and 7).

Figure 6:
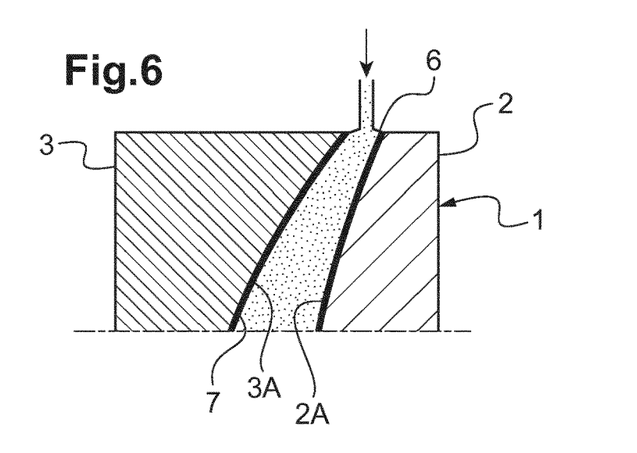
FIGS. 6 and 7 are schematic views in transverse section of two different mold assemblies at the end of filling.
Figure 7:
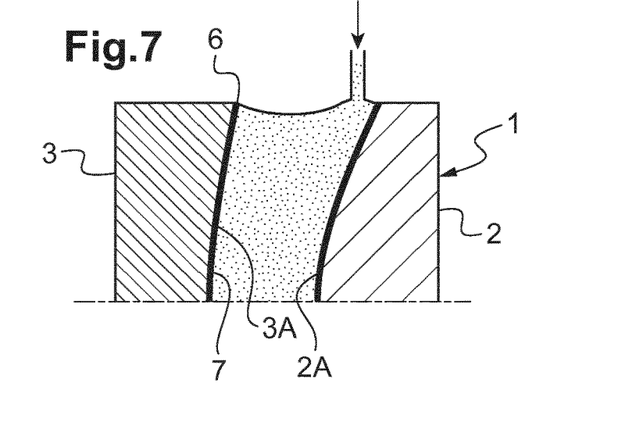

The medium radius of curvature of the convex internal face 2A is named "base".

The scotch tape 4 comprises an end 5 able to be unsticked from the edges of the molding shells 2, 3 to open a filling aperture 6 on the edge of the mold assembly 1.

The width W1 of this filling aperture 6 is defined as the distance between the uncovered edges of the molding shells 2, 3.

This mold assembly 1 is able to be filled by an automatized machine 10 (see FIG. 2) that is able to repeat the molding operations on several mold assemblies 1.

In practice, the mold assemblies 1 are arranged in batches and are processed one after the other by the machine 10.

The mold assemblies 1 of a same batch have essentially the same characteristics. In other words, in a single batch, the mold assemblies 1 are designed to produce the same lens, and have dimensions varying only by minute difference. For example, they have a same diameter with a margin (here 0.5 mm), a same filling aperture width W1 with a margin (here 0.3 mm) and a same base with a margin (here 0.06 dioptrie).

Figure 2:
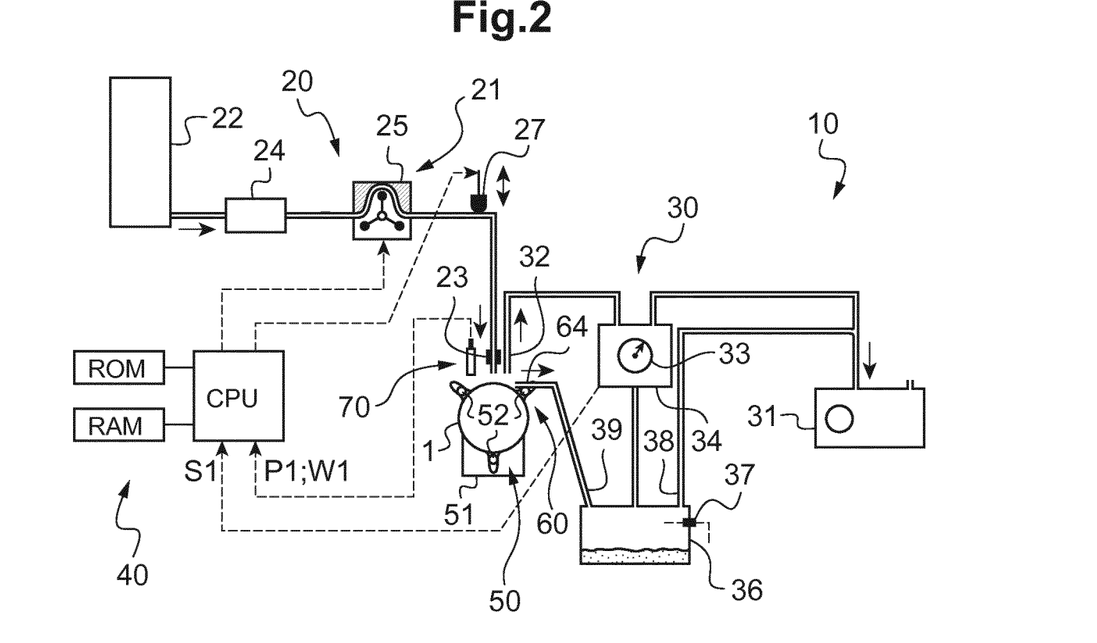
FIG. 2 is a schematic view of the machine according to the invention.

As shown on FIG. 2, according to the invention, the machine 10 for automatically filling the mold assembly comprises:

filling means 20 to fill the mold assembly 1 with the monomer through the filling aperture 6 provided in the mold assembly 1, acquiring means 70 to acquire an input value W1 linked to the internal volume of the mold assembly 1, and control means 40 for controlling the flow rate F1 of monomer injected by the filling means 20 in the mold assembly 1 according to a flow rate profile FR1, FR2 deduced as a function of said input value W1.

This machine 10 also comprises:

detecting means 30 for detecting a complete filling of the mold assembly 1 and for sending a signal S1 when the mold assembly 1 is completely filled (said control means 40 being suitable for receiving said signal S1 and for immediately stopping the injection of monomer when they receive said signal S1), holder means 50 for holding the mold assembly 1, and closing means 60 for closing the filling aperture 6 of the mold assembly 1 when the molding cavity 7 is full of monomer.

Here, the acquiring means are scanning means 70 for acquiring the width W1 and the position P1 of the filling aperture 6.

The holder means 50 include first a V-shaped base 51 on which the mold assembly 1 can be installed in such a manner that its filling aperture 6 opens upward in a vertical direction.

The holder means 50 include also a back and a front pusher (not shown) that are able to keep the mold assembly 1 in position.

In this example, the holder means 50 comprise a set of three concentrically-clamping jaws 52 that move along three intersecting axes oriented at 120 degrees relative to each other in order to clamp the mold assembly 1.

The clamping of the jaws 52 is controlled by a motor (not shown) having for instance a shaft secured to a gearwheel meshing with a ring adapted to drive the jaws 52 to move.

Thanks to these jaws 52, the holder means 50 are able to hold a wide variety of mold assemblies types (that have various diameters) and to acquire the diameter of the held mold assembly.

As shown on FIG. 2, the filling means 20 comprise a pump device 21 connected on the upstream side at a storage tank 22 containing the monomer and connected on the downstream side at an output nozzle 23. The pump device 21 is suitable for displacing the monomer from the storage tank 22 to the output nozzle 23.

A filter 24 is placed between the storage tank 22 and the pump device 21 to filter the monomer injected in the mold assembly 1.

In the shown example, the pump device 21 includes a 360° peristaltic pump 25.

Such a peristaltic pump 25 comprises a compressible internal pipe and at least one roller that turns around a shaft to compress sequentially said internal pipe. Such a peristaltic pump can be a pump referenced HV-07528-10, distributed by Masterflex, using a Masterflex Standard pump head for L/S 35 tubing, referenced HV-07035-20 also distributed by Masterflex, with a maximal speed of 600 rpm.

Such a pump device 21 has several advantages.

First, it delivers a laminar flow, which limits the creation of turbulences in the flow of monomer injected in the mold assembly 1.

Its electrical motor can be precisely controlled (in rotation speed and in acceleration), so that the interruption of the filling can be quickly operated.

It enables a displacement of the monomer through the pipe without any contact with the mechanical means of the pump device 21, which limits contamination of the monomer.

Moreover, the monomer flow rate depends more on the rotation speed of the electrical motor than on monomer's viscosity, which enables to employ monomers that have a viscosity varying in time.

Last, no pressure tank is necessary with such a pump device, so that it is easier to store the monomer. Moreover, as the monomer is not under pressure, the risks of leaks on the tank or on the pipes are reduced.

Figure 3:
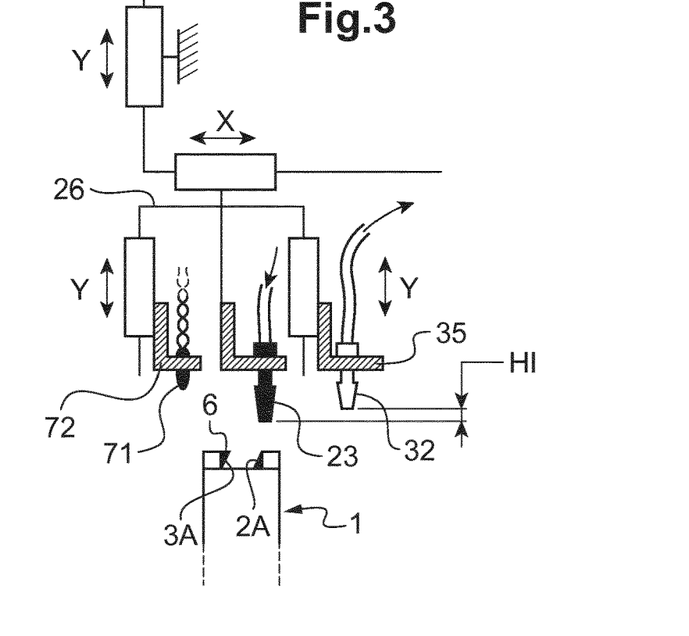
FIG. 3 is a detailed view of the filling head of the machine of FIG. 2.

As shown on FIG. 3, the output nozzle 23 is mounted on a head 26 that is mobile relative to the machine frame. This head 26 is mobile in translation along two orthogonal axes X, Y, the X axis being an horizontal axis with regard to the filling aperture and the Y axis being a vertical axis roughly perpendicular to a plan defined by said filling aperture.

Two motors have a drive shaft connected to the head via rack and pinion transmissions in order to transform the rotations of the shafts into linear movements of the head 26.

Thanks to these motors, the position of the output nozzle 23 relative to the filling aperture 6 of the mold assembly 1 may be adjusted. Particularly, it is possible to position the output nozzle 23 at a few millimeters above the filling aperture 6 (thanks to the X-axis mobility), near the convex interior face 2A of the molding cavity 7 (thanks to the Y-axis mobility). Thus, the monomer falling from the output nozzle 23 runs as much as possible all down this convex interior face 2A, which reduces flow perturbations.

Figure 5:
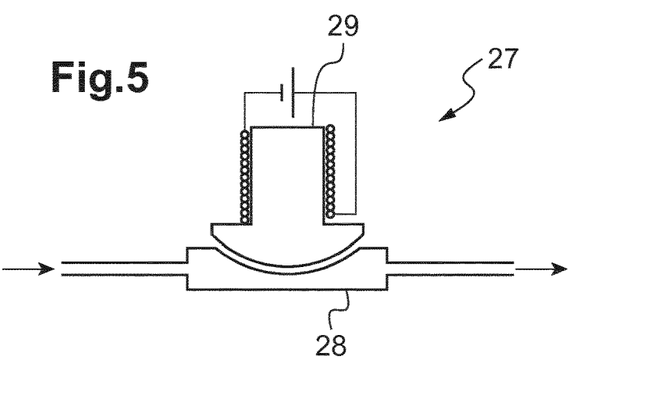
FIG. 5 is a schematic view of the pinch valve of the machine of FIG. 2.

The filling means 20 include a pinch valve 27 represented in detail on FIG. 5.

This pinch valve 27 comprises an axle 29 suitable for applying pressure on a compressible part 28 of the pipe that connects the pump device 21 to the output nozzle 23.

In the represented example, the axle 29 is actuated by a solenoid. When a current flows through the solenoid, the axle 29 is able to move between a compressed position in which the compressible part 28 of the pipe is partially pinched, and a released position in which the compressible part 28 of the pipe is totally released.

This pinch valve 27 has an anti-drop function. It is controlled to be in the compressed position during filling of the mold assembly 1 and to be in the released position as soon as the mold assembly is full of monomer in order to aspirate the drop of monomer situated in the output nozzle 23. The pinch valve 27 may be controlled by the control means to be released sensibly at the instant the mold assembly is detected as being full.

Thus, the pinch valve 27 enables to stop the monomer that would have fallen down out of the output nozzle 23 under influence of gravity after the interruption of the pump device 21.

Because the pump device 21 does not work at high pressure, a simple and cheap pinch valve 27 may be used.

As shown on FIG. 2, the detecting means 30 comprise a vacuum pump 31, a vacuum nozzle 32 positioned near the filling aperture 6 of the mold assembly 1, and a pressure sensor 33.

Here, this pressure sensor 33 is positioned in a vacuum buffer tank 34 linked, on the one side, with the vacuum pump 31, and, on the other side, with the vacuum nozzle 32. This position of the pressure sensor 33, in a vacuum buffer tank 34, is a preferred way in order to accelerate the detection of even small pressure variations. Thus, this pressure sensor 33 is able to detect the exact instant when the mold assembly 1 is completely filled allowing the pump device 21 to be immediately stopped at this exact instant.

The vacuum nozzle 32 is positioned relative to the machine frame so that it is able to suck any extra amount of molding material out of the mold assembly 1. Here, as shown FIG. 3, it is positioned on an arm 35 of said head 26, which arm 35 is mounted to slide the vacuum nozzle 32 along the Y axis. A motor is able to drive the position of the vacuum nozzle 32 relative to the output nozzle 23.

A reservoir tank 36 in plastic is connected on the back of the vacuum buffer tank 34 in order to capture the fall of monomer (see FIG. 2). It has a maximum level sensor 37. Above this level, the machine 10 can not be operated.

Figure 4:
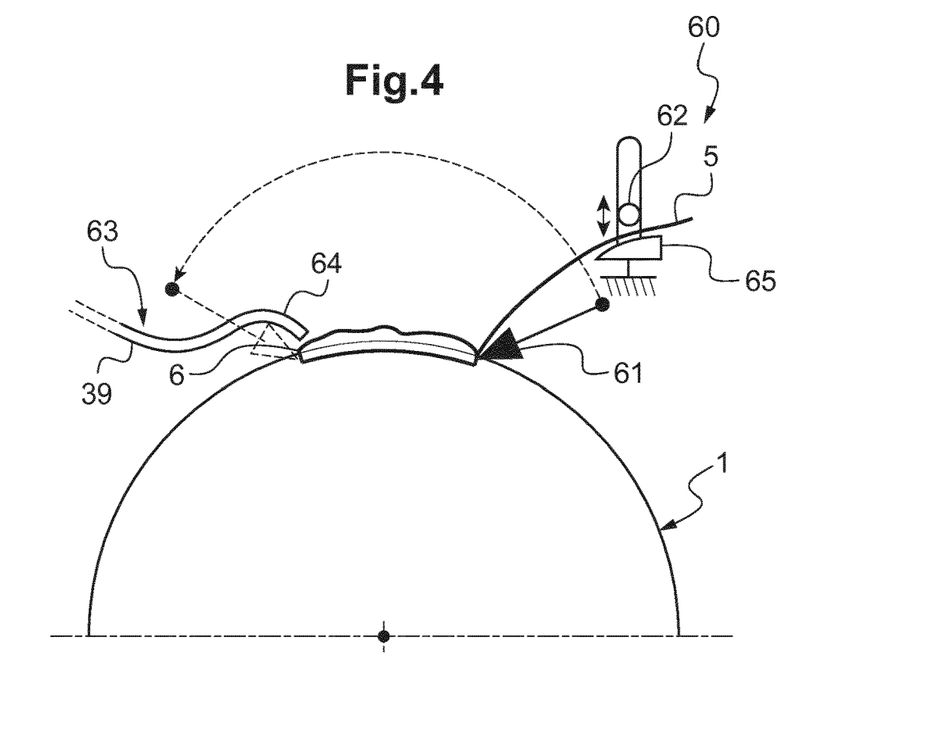
FIG. 4 is a schematic view of the closing means of the machine of FIG. 2.

As shown on FIG. 4, the closing means include a pusher 61 suitable for pushing the end 5 of the scotch tape 4 in order to close the filling aperture 6. They also comprise a tape holder 62 suitable for holding the end 5 of the scotch tape 4 during filling, and a vacuum suction device 63 to suck the excess of monomer pushed out by the scotch tape 4 while closing the filling aperture 6.

The pusher 61 has the shape of a broad wedge, with a sharp edge that is able to push the end 5 of the scotch tape 4 along the edge of the mold assembly 1. This pusher 61 is situated at an end of an arm that is rotatably mounted on the machine frame so that the sharp edge of the pusher 61 remains still directed towards the mold assembly center during closing of the filling aperture 6.

The tape holder is formed by a pin 62 that is mobile in translation relative to the machine frame so as to block the end 5 of the scotch tape 4 against a stop 65 of the frame machine and to release it when the filling operations have ended. A motor having a shaft connected to the pin 62 via a rack and pinion transmission is able to drive the pin 62 from a blocking position toward a release position and vice versa.

The vacuum suction device 63 comprises a waste nozzle 64 positioned beside the filling aperture 6, at the opposite of the opened end 5 of the scotch tape 4. This waste nozzle 64 is connected to the reservoir tank 36 by a first pipe 39, a second pipe 38 connecting said reservoir tank 36 to the vacuum pump 31 (see FIG. 2). Thus, the vacuum suction device 63 removes any excess monomer during closing process and ensures that mold assembly 1 is free from a monomer excess, ready to be unload by an operator.

The scanning means 70 represented on FIG. 2 are suitable for acquiring the width W1 and the position P1 of the filling aperture 6 and for determining which of the two internal faces 2A, 3A of the molding cavity 7 is convex.

As shown on FIG. 3, these scanning means 70 comprise an optical sensor 71 mounted on the head 26.

Here, the optical sensor 71 is a laser whose references are FD T40.

The optical sensor 71 is positioned on an arm 72 of said head 26, which arm 72 is mounted to slide the optical sensor 71 along the Y axis. A motor is able to drive the position of the optical sensor 71 relative to the output nozzle 23.

When the head 26 slides along the X-axis, this optical sensor 71 detects the four edges of the mold assembly 1, thanks to reflection of the laser on the sides of the mold assembly 1. It also detects the convex internal face 2A of the molding cavity 7.

This enables to measure the width W1 and to determine, on the one hand, the position of the center of the filling aperture 6 relative to the machine's frame, and, on the other hand, which is the convex internal face 2A of the molding cavity 7.

Determining the position of the filling aperture 6 and of the convex internal surface 2A enables to put the output nozzle 23 in a determined place for the filling of the molding cavity 7. Measuring the width W1 of the filling aperture 6 enables to determine the kind of shape of the lens to mold, with low-cost means. For that, as an example it will be considered here that the lenses are divided in four groups that are:
- the very thin edged lenses whose optical power is comprised between 6 and 5 diopter, and for which we know that the width W1 is comprised between 0.3 mm and 1 mm included,
- the thin edged lenses whose optical power is comprised between 4.75 and 1.25 diopter, and for which we know that the width W1 is comprised between 1 mm excluded and 4 mm included,
- the medium edged lenses whose optical power is comprised between 1.25 and −6 diopter, and for which we know that the width W1 is comprised between 4 mm excluded and 10 mm included, and
- the thick edged lenses whose optical power is comprised between −6.25 and −12 diopter, and for which we know that the width W1 is comprised between 10 mm excluded and 20 mm included.

The interest of this subdivision will be detailed in the following.

In a variant, we could have considered that the lenses are divided in two or three groups or in more than four groups.

As shown on FIG. 2, the control means comprise a microcontroller 40 including a processor (CPU), a random access memory (RAM), a read only memory (ROM), and several input and output interfaces for its communication with the other components of the machine 10.

Thanks to its input interfaces, the microcontroller 40 is adapted to receive:
- a signal S1 indicating the pressure in the vacuum buffer tank 34,
- another signal from the optical sensor 71, that points out the width W1 and the position P1 of the filling opening 6,
- a signal from the level sensor 37,
- a signal from a first button to control the camping of the jaws 52,
- a signal from a second button to initiate a "teaching mode",
- a signal from a third button to initiate the filling of a mold assembly.

In its RAM memory, the microcontroller 40 continuously stores these data.

In its ROM memory, the microcontroller 40 stores several predetermined values.

For instance, it stores a first database registry comprising four records associating two flow rates $F1_h$, $F1_l$ (expressed here as two pump working modes) to each width W1, according to the following table:

If W1∈[0.3 mm; 1 mm], $F1_h$=10 rpm pulsed and $F1_l$=5 rpm (very thin edged lenses), If W1∈]1 mm; 4 mm], $F1_h$=10 rpm and $F1_l$=5 rpm (thin edged lenses), If W1∈]4 mm; 10 mm], $F1_h$=16 rpm and $F1_l$=8 rpm (medium edged lenses), If W1∈]10 mm; 20 mm], $F1_h$=38 rpm and $F1_l$=19 rpm (thick edged lenses).

It also stores a second database registry comprising several records associating one time T1 to each width W1. As it will be explained below, this second database registry will be completed progressively, after each filling of a batch of mold assembly 1.

Thanks to these values stored in the ROM and RAM memories, the microcontroller 40 is able to calculate output signals to control the components of the machine 10.

With its output interfaces, the microcontroller 40 is adapted to transmit these output signals to these components. Thus, its is suitable for controlling:
- the positions of the jaws 52,
- the flow rate of the pump device 21,
- the position of the pinch valve 27,
- the position of the output nozzle 23 relative to the filling aperture 6,
- the position of the optical sensor 71 relative to the filling aperture 6,
- the position of the vacuum nozzle 32 relative to the output nozzle 23,
- the position of the pusher 61,
- the position of the pin 62,
- the starting and stopping of the vacuum pump 31.

When the operator receives a new batch of mold assembles, containing multiple mold assemblies that are supposed to be of the same volume, and to have the same internal shape, he installs a first mold assembly 1 in the holder means 50 of the machine 10.

More precisely, he puts the first mold assembly 1 on the base 51, between the back and front pushers (which are pushed toward each other by springs). Then, he presses on the first button to control the clamping of the jaws 52.

The operator opens the end 5 of the scotch tape 4 and blocks it between the pin 62 and the stop 65.

Alternatively, the operations done by the operator could be done through use of an automated loading module which would control the clamping of the jaws 52, manipulating the mold assembly, opening the scotch tape and blocking it.

At this step, the microcontroller 40 acquires the diameter of the mold assembly 1.

To indicate to the microcontroller 40 that the mold assembly 1 is the first one of a new batch, the operator presses the second button.

To initiate the filling of this first mold assembly 1, the operator presses the third button. The operator needs to push this button with its both hands to order the filling, which ensures that he is away from the dangerous filling zone. This step might be unnecessary in case of an automated loading module.

Figure 9:
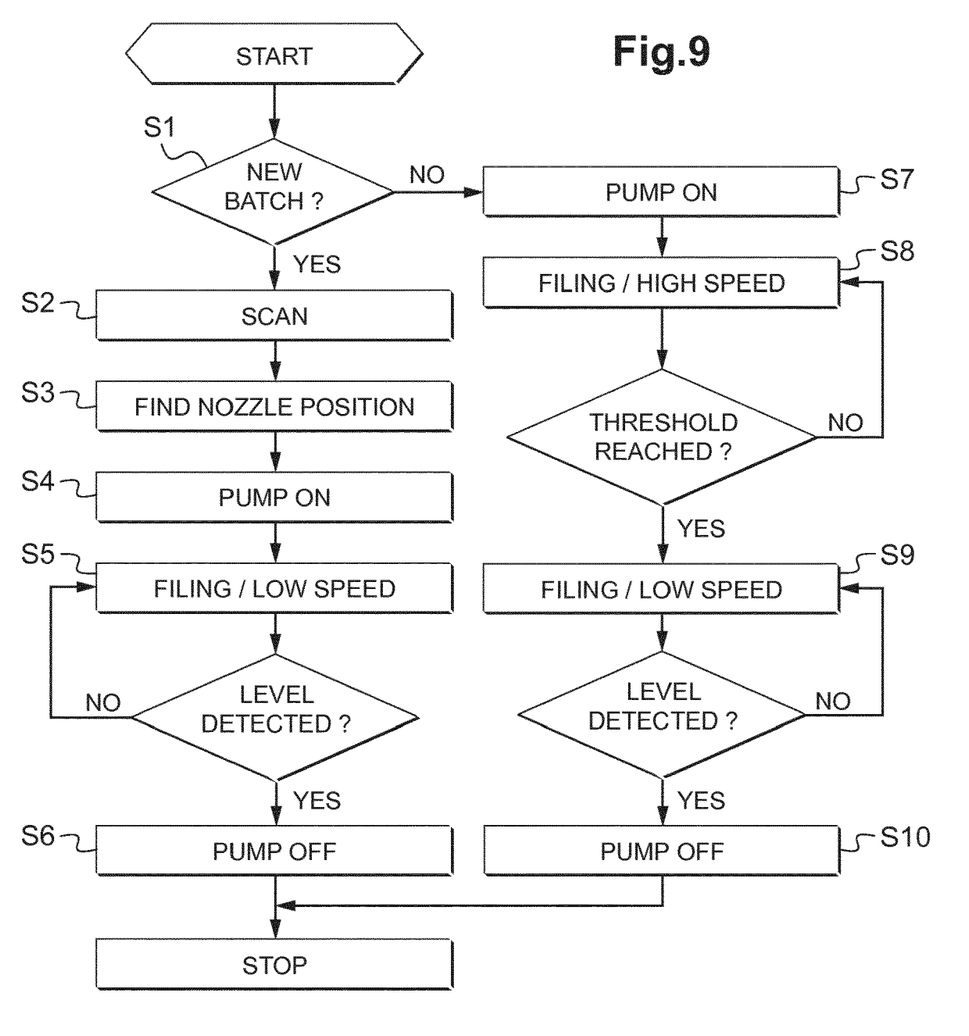
FIG. 9 is a detailed view of the algorithm for filling the mold assembly of FIG. 1.

The following steps are described in details on FIG. 9.

At step S1, the microcontroller 40 checks if the mold assembly 1 is the first of a new batch.

If so, at step S2, the microcontroller 40 scans the filling aperture 6.

For that, it controls the motors of the head 26 and of the optical sensor 71 so that this sensor scans the edge of the mold assembly 1 along all its width.

Thus, the microcontroller 40 acquires the width W1, the position P1 of the center of the filling aperture 6, and the position of the convex interior face 2A of the molding cavity 7.

Then, the microcontroller 40 controls the optical sensor 71 so that it lifts up relative to the output nozzle 23.

This step of scanning is operated only on the first mold assembly of the batch, assuming that the width W1, the position P1 of the center of the filling aperture 6, and the position of the convex interior face 2A of the molding cavity 7 will be the same for the other mold assemblies in the batch.

At step S3, before filling the molding cavity 7, the microcontroller 40 controls the position of the output nozzle 23 relative to the filling aperture 6 of the mold assembly 1.

For that, it controls the height of the head 26 relative to the machine frame in order to put the output nozzle 23 at 0 mm to 2 mm, in particular 0 mm to 1 mm above the filling aperture 6. This control is operated thanks to the stored diameter of the mold assembly 1.

The microcontroller 40 controls also the horizontal position of the head 26 relative to the machine frame in order to put the output nozzle 23 at 0 mm to 3 mm of the convex face 2A of the molding cavity 7, preferably 0.5 mm to 2 mm, but not farther than a mid-distance between the two sides of the mold.

After, the microcontroller 40 controls the height H1 (see FIG. 3) of the vacuum nozzle 32 relative to the output nozzle 23. It is well understood that this height imposes the instant when the complete filling of the molding cavity 7 is detected.

According to an advantageous characteristic of the invention, this height H1 is changed depending on the width W1. The height H1 might be changed and adapted according to each and any value of the width, or it could be a given value for each of the groups the lenses are assigned to in function of their width, or according to another type of grouping of the lenses according to the width of the aperture. In such case, the height is changing depending on the group but is of a constant value for each lens of one same group.

Indeed, the meniscus's shape is not the same depending on the width W1. As shown on FIGS. 6 and 7, if the width W1 is small, the meniscus has a dome shape, so that the vacuum nozzle 32 has to be positioned below the output nozzle 23 in order to detect filling before the meniscus becomes too big and to suck in excess monomer of the dome shaped meniscus. On the contrary, if the width W1 is large, the meniscus has a incurved shape, higher on the inner edges of the molding assembly, so that the vacuum nozzle 32 has to be positioned at the same height than the output nozzle 23 so as to allow a bit of overfilling to compensate the meniscus incurved shape.

In other words, the height H1 is adjusted so that, when the meniscus relaxes after the interruption of the monomer flow, the molding cavity 7 is completely filled without overflow.

Once the vacuum nozzle 32 and the output nozzle 23 are well positioned, the filling of the molding cavity 7 can start.

This step of positioning is operated only for the first mold assembly of the batch.

At step S4, the pump device 21 is controlled to supply the monomer according to a determined flow rate profile.

To acquire this flow rate profile, the microcontroller 40 reads in its first database registry the two flow rates $F1_h$, $F1_l$ associated to the width W1 measured.

Because the mold assembly 1 is the first of the batch, the molding cavity 7 is filled at constant low flow rate $F1_l$.

Figure 8:
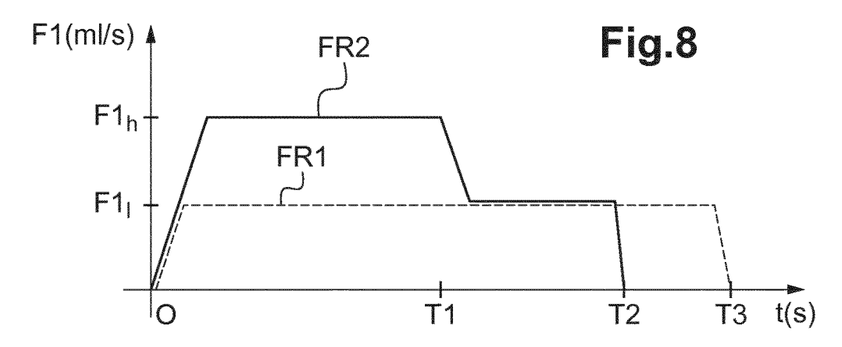
FIG. 8 is a graph illustrating the flow rate profile of filling of the mold assembly of FIG. 1.

The flow rate profile FR1 used is the one represented on FIG. 8 in broken line.

This flow rate profile FR1 includes a ramp-up to initiate the injection, a low-flow rate level, and a final ramp-down to end the injection.

Using a low-flow rate level prevents any perturbation in the flow of monomer at the end of the filling.

The duration of the ramp-up is determined in such a manner that it is not too short, to prevent perturbations in the flow of monomer at the beginning of the filling. This duration can be predetermined and stored in the ROM memory.

The duration of the ramp-down is as short as possible, to prevent overfill of monomer at the end of the filling. This duration depends on the ability to react of the components of the machine 10.

At step S5, during the filling of the molding cavity 7, the microcontroller 40 checks if a variation of pressure occurs in the vacuum nozzle 32.

At step S6, as soon as the pressure varies, the microcontroller 40 orders the stopping of the pump device 21 and the actuation of the pinch valve 27 (so that it moves from its compressed position to its released position).

Then, it memorizes an input value linked to the volume of the molding cavity 7. Here, this input value is the duration T3 of the filling of the molding cavity 7. In other words, the inner volume is here determined in term of "time needed to fill", so that the results are independent of the working conditions (the monomer viscosity, a replacement of the pump device . . . ).

During this step, the vacuum nozzle 32 aspirates any excess of monomer.

Then, the microcontroller 40 controls the tape holder in order to move the pin 62 toward its release position, to release the end 5 of the scotch tape 4.

At the same time, the microcontroller 40 controls the closing means 60 to move the pusher 61 so that it pushes the end 5 of the scotch tape 4 in order to close the filling aperture 6. During this operation, the vacuum suction device 63 sucks the excess of monomer pushed out by the scotch tape 4.

Because the monomer has not gone out of the molding cavity 7, the operator can remove the first mold assembly 1 from the holder means 50 without any danger.

Then, the operator installs a second mold assembly 1 in the holder means 50 of the machine 10.

This second mold assembly 1 belongs to the same batch as the first one. Thus, it is known that its volume is essentially the same as the volume of the first mold assembly.

This time, because this volume is known, it is possible to fill the second mold assembly 1 with a varying flow rate, that is higher at the beginning of the filling in order to shorten the duration of the filling, and that is lower at the end of the filling in order to prevent any perturbation in the flow of monomer.

Thus, before filling the molding cavity 7 of this second mold assembly 1, the microcontroller 40 determines a new flow rate profile FR2, represented on FIG. 8 in solid line.

This flow rate profile FR2 includes a ramp-up to initiate the injection, a high-flow rate level, an intermediate ramp-down, a low-flow rate level, and a final ramp-down to end the injection.

The value $F1_h$, $F1_l$ of the high-flow rate and low-flow rate levels are the one already read in the first database registry and associated to the width W1 measured. These values correspond to pump speeds. The flow-rate profile is thus determined in dependence of the width W1 measured.

The duration T1 after which the flow rate decreases from the high-flow rate level towards the low-flow rate level is chosen to be such that at T1, the mold assembly is filled with a high flow filling ratio Rh comprised between 50% and 95%. Here, the high flow filling ratio Rh is chosen to be equal to 65%. The high flow filling ratio Rh may be defined as a percentage of the mold's volume that is filled after the duration T1, when the flow rate profile switches from high flow rate level to low flow rate level.

In a first approximation, the duration T1 can be calculated in correspondence to the chosen high-flow filling ratio Rh, the duration T3, and the values $F1_h$, $F1_l$, for example according to the following equation: $R \times T3 \times F1_l = T1 \times F1_h$. Thus T1 can be estimated as equal to $(R \times F1_l \times T3)/(F1_h)$.

The duration T2 is calculated in correspondence, as a function of the duration T3, T1 and of the values $F1_h$, $F1_l$. In a first approximation, the duration T2 is calculated in correspondence such that $T3 \times F1_l = T1 \times F1_h + (T2-T1) \times F1_l$ If a different flow-rate Fx is used for filling the first mold, the above equations stay true, with "T3×Fx" used instead of "T3×F1$_l$".

The duration of the ramp-up is determined in such a manner that it is not too short, to prevent perturbations in the flow of monomer at the beginning of the filling. This duration of the ramp-up is greater than 0.6 second. It is here equal to 1 second.

The duration of the intermediate ramp-down is determined in a similar way. This duration is greater than 0.3 second. It is here equal to 0.5 second.

The calculation of the durations T1 and T2 may comprise taking into account the effect of the different ramp-up and ramp-down.

These durations can be predetermined and stored in the ROM memory.

The duration of the final ramp-down is as short as possible, to prevent an excess of monomer in the molding cavity 7. Here, it is shorter than 0.2 second.

Once the microcontroller 40 has calculated the flow rate profile FR2, at step S1, it checks if the mold assembly 1 is the first of a new batch.

Here, because it is not the case, at step S7, the microcontroller 40 orders directly the switching on of the pump device 21 according to the ramp-up in order to reach the high-flow rate level.

At step S8, the microcontroller 40 measures the duration of the filling. As soon as this duration reaches a threshold (here the duration T1), the microcontroller 40 orders the deceleration of the pump device 21 according to the intermediate ramp-down in order to reach the low-flow rate level.

At step S9, the microcontroller 40 checks if a variation of pressure occurs in the vacuum nozzle 32.

As soon as the pressure varies, the microcontroller 40 orders the stop of the pump device 21 (step S10) and the actuation of the pinch valve 27 (so that it moves from its compressed position to its released position). During this step, the vacuum nozzle 32 aspirates any excess of monomer.

Then, the microcontroller 40 controls the tape holder and the closing means 60 to close the filling aperture 6. During this step, the vacuum suction device 63 sucks the excess of monomer pushed out by the scotch tape 4.

Finally, the operator can remove the second mold assembly 1 from the holder means 50. He may operate in a similar way to fill the other mold assemblies of the batch.

In the embodiment previously described, named first variant, it is well understood that the scanning step and the step of positioning the output and vacuum nozzles are systematically implemented on the first mold assembly, even if the mold assemblies of the previously processed batch had the same characteristics. In this embodiment, there is no need to use the second database registry. Moreover, there is no need for the operator to try to process the similar batches one after the other.

In a second variant of the invention, at each new batch, the microcontroller 40 may measure the width W1 of the first mold assembly and its diameter (thanks to the jaws 52). If this width W1 is roughly equal to the width W1 measured on the first mold assembly of a previously processed seed batch which determined the flow rate profile used for filling the immediately previously processed batch, and the diameters are essentially equal, it does not change the settings of the machine 10 and fills all the mold assemblies of this new batch according to the flow rate profile FR2 calculated for the previously processed batch. Else, the microcontroller 40 operates in the same manner that the one previously described. This variant ensures a better productivity if the operator tries to process similar batches one after the other. Indeed, the teaching mode, using a learning flow rate profile FR1, which takes longer to process than the determined flow rate profile FR2, is only used for filling first molds of batches that have inner volume that differ a lot from the seed batch. By roughly equal, one means that the new batch has molds with a width equal, within a +/−1 mm margin, to the value of the width W1 of the molds of the seed batch used to determine the flow-rate profile.

In particular, if the widths are roughly equal and the diameters are essentially equal, that means that the internal volume of the molds of the new batch and the internal volume of the molds of the seed batch are roughly equal.

In other words, in this variant, when the width of the molds of the new batch is roughly equal to the width of the seed batch, the flow rate profile FR2 calculated for the previously processed batch is used for filling the first mold of the new batch. Then the other molds of the batch are filled using the same flow rate profile FR2 calculated for the previously processed batch.

In an embodiment of this second variant, the flow rate profile FR2 calculated for the previously processed batch is used as the flow rate profile for the teaching mode of first mold of the new batch. This means that the first mold is filled according to the flow rate profile FR2, with a known high flow rate level $F1_h$, a known low flow rate level $F1_l$ and a known high flow rate level duration T1. Then the machine determines the duration $T3_2$ at which the mold is detected as filled by the vacuum sensor.

Using the known high flow rate level $F1_h$, the known low flow rate level $F1_l$ and the known high flow rate level duration T1 for the used flow rate profile, and the duration $T3_2$, the machine may determine a new flow rate profile adapted to this new batch, with personalized durations for the high flow rate level $T1_2$ and low flow rate level $T2_2$ and potentially of the high flow and low flow rate levels if such desired. Such variant enables to benefit from not having to use learning flow rate profile for the teaching mode, thus improving productivity, while using flow rate profiles adapted to the molds of the new batch.

This embodiment may be used even when the width W1 that is measured is different from the width W1 of the seed batch from by than 1 mm. For example, as long as the width W1 of the new batch is either roughly equal or larger, or even if the diameter is different, such as larger. Indeed, as long as the high flow rate level duration T1 of the previously determined flow rate profile leads to a high flow filling ratio of less than 80%, preferably 65%, or less than 90% when the nozzle is oriented, the first mold of the new batch may be filled without troubles and the filling parameters may be used to determine a more adapted profile for the following molds.

It is to be noted that in this embodiment, the teaching mode applied to the first mold of the new batch does not use a flow rate profile that exhibits mainly a single constant value, determined as a function of the width, but the measured width, and potentially diameter determines if the teaching mode uses a constant flow rate profile or the flow rate profile determined for the seed batch.

In a third variant of the invention, when the microcontroller 40 calculates the flow rate profile FR2, it may create a new record in the second database registry that associates the measured width W1 to this flow rate profile FR2. Thus, in the future, after having read the width W1 on a mold assembly of a next batch, the microcontroller 40 will be able to search in the second database registry for a record associated to this width W1. And, if such a record exists, it will be able to read a flow rate profile FR2, so that it will not be forced to calculate it. This method ensures a better productivity, because the first mold assembly of this next batch will be filled according to the flow rate profile FR2.

In an embodiment, the second and third variants described above may be selectively applied for any batch having mold assemblies with a width W1 greater than a determined value, for example such that the width W1 is greater than 4 mm, and the first variant may be applied for every batch of width smaller or equal than 4 mm. Such value of 4 mm may be changed depending on the diameter of the lenses or on the index of the polymerized molding material or on other process parameters. However, the inventors find that an edge width value corresponding to molds for lenses having an optical function of less than +1 D can be an adequate value.

The present invention is not limited in any way to the embodiments described and shown, and the person skilled in the art knows how to apply any variant in accordance with its spirit.

According to another variant of the invention, the output nozzle could be oriented not vertically, but for example toward the concave interior face of the mold assembly. The inclination of the output nozzle will ensure a better filling of the molding cavity, without perturbation in the flow. Thanks to a good choice of the inclination, it may be possible to fill the 90% of the molding cavity at a high flow rate level, without any perturbation. In another variant, the microcontroller may acquire the curvature (or base) of the convex interior face of the molding cavity, and incline the output nozzle according to this base to ensure a better filling.

According to another variant of the invention, the input value according to which the flow rates are calculated, may be formed not by the width W1 but for instance by characteristics of the mold assembly related to the internal volume of the mold assembly and read on a barcode.

According to another variant of the invention, the machine may be partially manual, with for instance a handle to move the closing means.

According to another variant of the invention, the machine may process mold assemblies having different structures from the structure represented on FIG. 1. For instance, the mold assemblies would have an annular closure member that would be formed by a gasket having a filling aperture able to be closed by a cap.

The invention claimed is:

1. A machine for an automated filling of a mold assembly for molding an ophthalmic lens, the machine comprising:
   filling means to fill the mold assembly with a molding material through a filling aperture provided in the mold assembly;
   acquiring means to acquire an input value linked to the internal volume of the mold assembly; and
   control means for controlling a flow rate of molding material injected by the filling means in the mold assembly according to a flow rate profile determined as a function of said input value;
   wherein the acquiring means comprises scanning means suitable to scan an edge of the mold assembly for determining the width of said filling aperture, determining an internal face is convex, and determining a position of the internal face of the mold assembly which is convex, and
   wherein a microcontroller is programmed to control the position of a nozzle of the filling means as a function of the determined position of said internal face in order to position said nozzle relative to said convex internal face.

2. The machine according to claim 1, wherein said input value is the width of the filling aperture, measured between two molding shells of the mold assembly.

3. The machine according to claim 1, suitable for filling a batch of several mold assemblies having essentially a same internal volume, wherein the control means is configured for:
   controlling the flow rate of molding material injected in a first mold assembly according to a learning flow rate profile that is determined as a function of the measured input value;
   when the first mold assembly is completely filled, acquiring a measured value that is relative to the internal volume of the first mold assembly; and
   filling the other mold assemblies of the batch according to a flow rate profile determined as a function of said measured value.

4. The machine according claim 3, further comprising:
   the microcontroller;
   wherein:
      said microcontroller is programmed to control the position of said nozzle to position said nozzle relative to said convex internal face such that the molding material falling from the filling means runs as much as possible down this convex internal face; and
      said measured value is the duration of the filling of the first mold assembly.

5. The machine according to claim 1, wherein the flow rate profile comprises at least a first flow rate level and a second flow rate level determined as a function of said input value, said first flow rate level being greater than said second flow rate level.

6. The machine according to claim 4, wherein:
   the flow rate profile comprising at least a first flow rate level and a second flow rate level determined as a function of said input value, said first flow rate level being greater than said second flow rate level, and
   said measured value is the duration of the filling of the first mold assembly, and
   a duration of the first flow rate level is determined by the control means as a function of said measured value and said input value.

7. The machine according to claim 1, further comprising:
   detecting means for detecting a complete filling of the mold assembly and for sending a signal to the control means when the mold assembly is completely filled, the control means being configured to stop the injection of molding material based said signal received from the detecting means.

8. The machine according to claim 7, wherein the control means is further configured for positioning the detecting means and the filling means relative to each other as a function of said input value, along an axis present in a plan representative of the filling aperture and along an axis perpendicular to said plane.

9. The machine according to claim 7, wherein the detecting means comprises:
   a vacuum pump with a vacuum nozzle positioned and configured to suck an amount of excess molding material out of the mold assembly; and
   a sensor suitable for measuring a pressure in said vacuum nozzle.

10. The machine according to claim 1, wherein:
the filling means comprises a pump suitable for displacing the molding material from a storage tank to an output nozzle,
the control means is further configured for controlling the pump,
a pinch valve is configured to apply pressure on a pipe connecting the pump and the output nozzle, and
the control means is further configured for controlling the pinch valve so that the pinch valve applies pressure against the pipe during the filling of the mold assembly and the pinch valve releases the pressure on the pipe based on the mold assembly being completely filled.

11. The machine according to claim 1, wherein:
the mold assembly comprises two molding shells and an annular closure adhesive tape disposed at the periphery of the molding shells,
closing means are provided with a pusher configured to push an end of the adhesive tape to close the filling aperture,
the control means is further configured for controlling the position of the pusher, and
the closing means comprises a vacuum suction device configured to suck an excess amount of molding material pushed out by the adhesive tape while closing the filling aperture.

12. The machine according to claim 1, wherein, after having acquired said input value, the control means is further configured for searching in a database registry for a record associated to said input value, and if no corresponding record is found, creating a new record associated with said input value and containing a flow rate profile.

13. The machine according to claim 1, wherein said control means is further configured for positioning the nozzle of the filling means.

14. The machine according to claim 3, wherein the learning flow rate profile exhibits mainly a single constant value.

15. The machine according to claim 5, wherein the flow rate profile includes in the following order a ramp-up to initiate the filling of the mold assembly, a first flow rate level, an intermediate ramp-down, a second flow rate level, and a final ramp-down to end the flow and thus end the filling of the mold assembly.

16. The machine according to claim 6, wherein the flow rate profile includes in the following order a ramp-up to initiate the filling of the mold assembly, a first flow rate level, an intermediate ramp-down, a second flow rate level, and a final ramp-down to end the flow and thus end the filling of the mold assembly.

17. The machine according to claim 6, wherein durations of any ramp-up and of any ramp-down are determined by the control means as a function of said input value.

18. The machine according to claim 8, wherein the control means is further configured for positioning the detecting means and the filling means relative to each other and to the filling aperture as a function of said input value.

19. A system for filling of a mold assembly for molding an ophthalmic lens, the system comprising:
scanning means suitable to scan an edge of the mold assembly for detecting an internal face of the mold assembly as being convex;
means for positioning a nozzle at a location based on the detected convex internal face and with respect to a filling aperture of the mold assembly, said nozzle being positioned relative to said convex internal face;
means for filling the mold assembly with a molding material through a filling aperture provided in the mold assembly; and
means for controlling a flow rate of molding material injected by the means for filling into a cavity of the mold assembly.

20. A system for filling of a mold assembly for molding an ophthalmic lens, the system comprising:
scanning means suitable to scan an edge of the mold assembly for detecting an internal face of the mold assembly as being convex;
a microcontroller configured to:
receive an indication of a width of a filling aperture of a mold assembly;
detect an internal face of the mold assembly as being a convex internal face of the mold assembly;
initiate positioning of a nozzle at a location based on the detected convex internal face and with respect to the filling aperture, said nozzle being positioned relative to said convex internal face; and
initiate filling of the mold assembly with a molding material through the filling aperture and via the nozzle while the nozzle is positioned at the location.

21. The system according to claim 20, wherein:
the microcontroller is further configured to:
determine a flow rate profile based on an input value corresponding to an internal volume of a mold assembly having the convex internal face and a concave internal face; and
control, based on the flow rate profile, a flow rate of molding material injected into the mold assembly.

22. The system according to claim 21, wherein:
the microcontroller is further configured to:
receive the input value; and
determine a center of the filling aperture; and
acquire a curvature of the convex internal face;
to detect the convex internal face, the microcontroller is configured to detect the convex internal face as one of the convex internal and the concave internal face,
the location, with reference to the center of the filling aperture, is closer to the convex internal face than to the concave internal face, and
the flow rate profile comprises at least a first flow rate level and a second flow rate level determined as a function of the input value, said first flow rate level being greater than said second flow rate level.

23. The system according to claim 22, wherein:
the location is less than or equal to 3 millimeters (mm) from the convex internal face or is included in a range of 0.5 mm to 2 mm from the convex internal face, and
the flow rate profile includes in the following order a ramp-up to initiate the filling of the mold assembly, the first flow rate level, an intermediate ramp-down, the second flow rate level, and a final ramp-down to end the flow.

24. The machine according to claim 1, wherein the microcontroller is programmed to control the position of a nozzle of the filling means as a function of the determined position of said internal face in order to position said nozzle at 0 mm to 3 mm of said convex internal face.

* * * * *